(12) United States Patent
Tamura et al.

(10) Patent No.: US 8,415,413 B2
(45) Date of Patent: Apr. 9, 2013

(54) EYEGLASS LENS MADE OF ALLYL DIGLYCOL CARBONATE RESIN

(75) Inventors: Kanichi Tamura, Osaka (JP); Shoichi Mitsuuchi, Kanan (JP); Kenzo Wada, Kashiwara (JP)

(73) Assignee: Talex Optical Co., Ltd., Osaka (JP)

( * ) Notice: Subject to any disclaimer, the term of this patent is extended or adjusted under 35 U.S.C. 154(b) by 106 days.

(21) Appl. No.: 13/012,983

(22) Filed: Jan. 25, 2011

(65) Prior Publication Data

US 2012/0188503 A1 Jul. 26, 2012

(51) Int. Cl.
*C08K 5/34* (2006.01)
*B32B 27/28* (2006.01)

(52) U.S. Cl.
USPC ............... 524/88; 523/105; 428/412

(58) Field of Classification Search ......... 524/88; 523/105; 428/412
See application file for complete search history.

(56) References Cited

U.S. PATENT DOCUMENTS

| | | | |
|---|---|---|---|
| 6,177,032 B1 * | 1/2001 | Smith et al. | 264/1.34 |
| 6,827,325 B2 * | 12/2004 | Hofmann et al. | 249/134 |
| 7,999,989 B2 * | 8/2011 | Asai et al. | 359/241 |
| 2008/0218683 A1 * | 9/2008 | Lam et al. | 351/117 |
| 2009/0316246 A1 * | 12/2009 | Asai et al. | 359/241 |

FOREIGN PATENT DOCUMENTS

JP  2008-134618  6/2008

* cited by examiner

*Primary Examiner* — Kriellion Sanders
(74) *Attorney, Agent, or Firm* — Wenderoth, Lind & Ponack, L.L.P.

(57) ABSTRACT

[Problems] The invention provides a plastic lens for eyeglasses by using diethylene glycol bisallyl carbonate as a lens material and which is made to have a main absorption peak in a wavelength range of 565 nm to 605 nm by mixing a coloring agent in which a visible light-absorption spectroscopic spectrum contains an azaporphyrin compound and to be durable for use as eyeglasses and polarized eyeglasses owing to the good antiglare and visibility properties of the coloring agent. [Solving means] The eyeglass lens made of an allyl diglycol carbonate resin which has a main absorption peak of visible light spectroscopic transmittance in a wavelength range of 565 nm to 605 nm as shown in FIG. 1 is obtained by using diethylene glycol bisallyl carbonate as a lens material, mixing an organic coloring agent containing a tetraazaporphyrin compound, mixing a peroxyester type peroxide or a peroxyketal type peroxide with a 10 hour-half life temperature of 90 to 110° C. as a polymerization initiator, and polymerizing, defoaming, and curing the lens material.

17 Claims, 4 Drawing Sheets

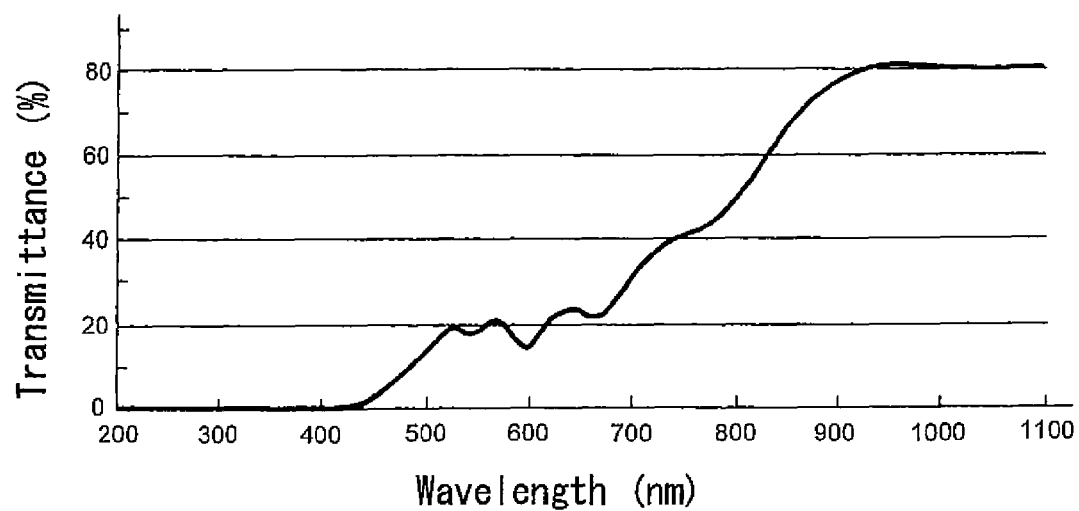
Fig.10 Comparative Example 5

EYEGLASS LENS MADE OF ALLYL DIGLYCOL CARBONATE RESIN

TECHNICAL FIELD

This invention relates to a plastic lens for eyeglasses with a light-absorbing capability and a plastic lens for polarized eyeglasses, more particularly a lens made of an allyl diglycol carbonate resin for eyeglasses such as polarized eyeglasses and a production method of the same.

BACKGROUND ART

In general, it has been known that a plastic lens for eyeglasses can be provided with antiglare and good visibility functions by mixing an organic coloring agent.

For example, spectacle lenses made of plastics which shield visible light rays with wavelength around 585 nm to lessen the unpleasantness and visual sense fatigue relevant to glare by selectively shielding the light rays in a wavelength band in which glare is felt.

Resins used for spectacle lenses include thermoplastic resins such as acrylic resins, polystyrene resins and polycarbonate resins, and also thermosetting resins such as allyl diglycol carbonate resins (also referred to as CR-39 resin or ADC resin), polyurethane resins, and polythiourethane resins, etc.

Such thermosetting resins are converted into lens materials by preparing raw material compositions by mixing raw material compositions with a catalyst, a curing agent, and if necessary a template agent, a resin reforming agent, an ultraviolet absorbing agent, an infrared ray absorbing agent, an antioxidant, etc.; degassing and mixing the mixtures; next, injecting the mixtures in molds of glass dies or metal dies; and thereafter polymerizing and curing the mixtures, and heat treatment is carried out for the polymerizing and curing.

As a catalyst usable for the polymerizing and curing, organic peroxides have been known and there are compounds broadly classified into diacyl peroxides, peroxydicarbonates, peroxyesters, peroxyketals, dialkyl peroxides, hydroperoxides, etc.

The CR-39 resin is obtained by curing a composition obtained by mixing diethylene glycol bisallyl carbonate, which is a monomer, with a peroxydicarbonate type peroxide (e.g. diisopropyl peroxydicarbonate) as a catalyst.

There is known a material provided with good balance between the antiglare property and visibility and thus having both functions of practical usability and color tone by adding an organic coloring agent such as an azaporphyrin compound to make a product lens have a main absorption peak in a range of 565 nm to 605 nm in a visible light-absorption spectroscopic spectrum (Patent Document 1).

PRIOR ART DOCUMENT

Patent Document

[Patent Document 1] Japanese Patent Application Laid-Open (JP-A) No. 2008-134618 (claims 1 and 4, 0002, 0053).

SUMMARY OF THE INVENTION

Problems to be Solved by the Invention

However, the above-mentioned functional plastic lenses for eyeglasses having a light-absorbing capability are merely lenses using a tetraazaporphyrin compound as an organic coloring agent and a specified resin as a thermosetting resin to be the lens materials.

That is, unless a resin is a polycarbonate resin, a polyamide resin, a polythiourethane resin, or a thermosetting acrylic resin as a plastic lens material with which a tetraazaporphyrin compound is mixed as an organic coloring agent, the light-absorbing capability of the tetraazaporphyrin compound may possibly be inhibited.

In the paragraph [0053] of Patent Document 1 is disclosed restrictive use of "a polycarbonate resin or a polyamide resin as a thermoplastic resin" for a spectacle lens material using an azaporphyrin compound as an organic coloring agent.

Generally, when an eyeglass lens is produced by using a monomer of diethylene glycol bisallyl carbonate (CR-39) of a thermosetting resin commonly used as a spectacle lens material and an azaporphyrin compound as an organic coloring agent, there is a problem that the azaporphyrin compound is decomposed in the process of polymerization reaction and curing (crosslinking) reaction and the lens becomes insufficient in the aimed light-absorbing property, that is, a property of shielding light with wavelength around 585 nm.

In addition, the countermeasure for suppressing the polymerization reaction to avoid such a problem based on temperature, time, and a catalyst is undesirable since it possibly lowers the hardness usually proper for lenses.

It is not so easy to reliably obtain light-absorbing property in a prescribed wavelength range for an eyeglass lens made of an allyl diglycol carbonate resin and sufficiently heighten the functions relevant to antiglare and visibility properties under such variously limited conditions.

Therefore, the aim of the invention is to solve the above-mentioned problems and to provide a plastic lens for eyeglasses by using diethylene glycol bisallyl carbonate as a lens material, which is a plastic lens having a main absorption peak between 565 nm to 605 nm in a visible light absorption spectroscopic spectrum by mixing a coloring agent containing an azaporphyrin compound and durable for use for eyeglasses and polarized eyeglasses based on good antiglare and visibility properties due to the coloring agent.

Means for Solving the Problems

To solve the above-mentioned problems, the present invention provides an eyeglass lens made of an allyl diglycol carbonate resin having a main absorption peak of visible light spectral transmittance in a wavelength range of 565 nm to 605 nm by mixing an organic coloring agent containing a tetraazaporphyrin compound with diethylene glycol bisallyl carbonate as a lens material, mixing a peroxyester type peroxide or a peroxyketal type peroxide with a 10 hour-half life temperature of 90 to 110° C. as a polymerization initiator, and polymerizing and curing the lens material.

With respect to the eyeglass lens made of an allyl diglycol carbonate resin of the invention configured in the above-mentioned manner, owing to use of diethylene glycol bisallyl carbonate as the lens material and addition of a peroxyester type peroxide or a peroxyketal type peroxide with a 10 hour-half life temperature of 90 to 110° C. as a prescribed polymerization initiator, the tetraazaporphyrin compound of the organic coloring agent is not decomposed or deformed when the monomer, which is the lens material, is polymerized and cured.

Even in a lens made of an allyl diglycol carbonate resin containing a tetraazaporphyrin compound becomes a lens made of a resin provided with sufficiently exhibited properties of the tetraazaporphyrin compound as an organic coloring agent and a scarcely decreased absorption property of visible light spectral transmittance in a wavelength range of 565 nm to 605 nm.

Other absorption peaks are not particularly limited if there is an absorption peak with sufficient transmittance in the prescribed wavelength region and the eyeglass lens made of an allyl diglycol carbonate resin may contain, based on the necessity, an organic coloring agent such as an ultraviolet-absorbing coloring agent, or an infrared ray-absorbing coloring agent, or both coloring agents.

As such a lens is an eyeglass lens made of an allyl diglycol carbonate resin with a main absorption peak of visible light spectral transmittance of 10% or less transmittance particularly preferable.

For such a lens, usable as a peroxyester type peroxide is t-hexyl peroxybenzoate, t-butyl peroxybenzoate, t-hexyl peroxyisopropyl monocarbonate, or t-butyl peroxyacetate.

In the above-mentioned lens, a peroxyketal type peroxide may be 1,1-di(t-butylperoxy)cyclohexane.

Further, the above-mentioned eyeglass lens made of an allyl diglycol carbonate resin may be a polarized lens having a polarizing film layer.

The polarizing film in the polarized lens is preferably a film made of polyvinyl alcohol and containing an iodine type polarizing agent as a polarizing agent to obtain an eyeglass lens made of an allyl diglycol carbonate resin with better balance of the antiglare and visibility properties and having functions satisfying both practical usability and color tone.

Effect of the Invention

The invention is advantageous for giving a lens for eyeglasses or a lens for polarized eyeglasses which exhibits a visible light absorption spectroscopic spectrum having a sufficient main absorption peak in a range of 565 nm to 605 nm due to an addition of a coloring agent containing an azaporphyrin compound since an organic coloring agent containing a tetraazaporphyrin compound is added in combination with a prescribed organic peroxide as a polymerization initiator in the case of employing diethylene glycol bisallyl carbonate as a lens material.

BRIEF DESCRIPTION OF THE DRAWINGS

FIG. 10: A graphic chart showing spectroscopic spectrum of Comparative Example 5 and showing the relation of wavelength and transmittance.

MODE FOR CARRYING OUT THE INVENTION

Figure 1:
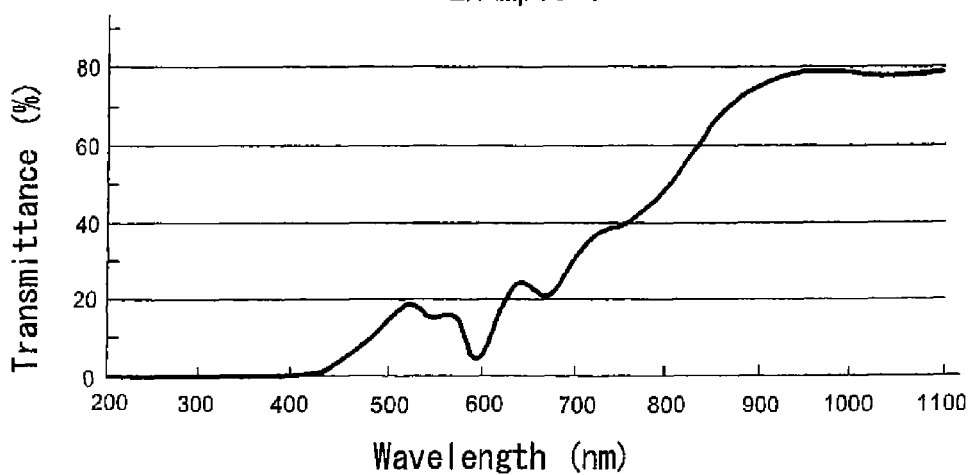
FIG. 1: A graphic chart showing spectroscopic spectrum of Example 1 and showing the relation of wavelength and transmittance.

An eyeglass lens made of an allyl diglycol carbonate resin of the invention is obtained by using diethylene glycol bisallyl carbonate as a lens material, mixing an organic coloring agent containing a tetraazaporphyrin compound, and further mixing a peroxyester type peroxide or a peroxyketal type peroxide as a polymerization initiator with a 10 hour-half life temperature of 90 to 110° C.

The diethylene glycol bisallyl carbonate of the lens material is well known resin lens material (monomer) developed by PPG in 1940's or later and produced no less than 20000 t/year all over the world.

A representative polymerization method for producing a plastic lens using diethylene glycol bisallyl carbonate may be a casting type polymerization method. In this case, a resin raw material composition containing the resin lens material, an organic coloring agent, and other necessary additives is injected in a mold of two glass dies or metal dies which are arranged for producing a lens for eyeglasses while a gasket or a tap being inserted between them and thereafter polymerized and cured in prescribed polymerization conditions and the resulting product is released from the glass dies or metal dies to obtain a plastic resin material.

For the polymerization and curing, the composition is injected in a casting mold for lens casting and the casting mold for lens casting is heated in an oven or water for several hours or several ten hours according to prescribed temperature program to carry out polymerization and curing and thus mold a lens for eyeglasses.

The polymerization and curing is heating treatment at a temperature around 20 to 100° C. for 1 to 48 hours while the temperature being properly adjusted in accordance with the composition of the resin raw material, the catalyst, and shape of the mold and on completion of the curing and molding, the lens material for plastic eyeglasses can be obtained by taking the obtained lens from the casting mold for lens casting.

The tetraazaporphyrin compound, an indispensable component, for the organic coloring agent to be used in the invention is a conventionally known compound defined by the following formula 1 and PD-311S produced by Mitsui Chemicals Inc., and TAP-2 and TAP-9 produced by Yamada Chemical Co., Ltd. can be used as commercialized products defined by the following formula 2.

[Chemical formula 1]

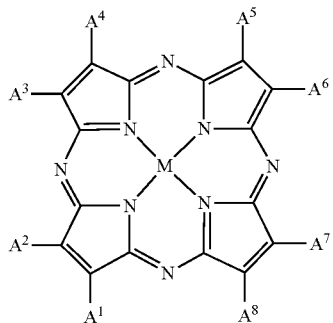

[In the formula (1), A1 to A8 independently denote a hydrogen atom, a halogen atom, a nitro group, a cyano group, a hydroxy group, an amino group, a carboxyl group, a sulfonic acid group, a C1-20 straight, branched or cyclic alkyl group, a C1-20 alkoxy group, a C6-20 aryloxy group, a C1-20 monoalkylamino group, a C2-20 dialkylamino group, a C7-20 dialkylamino group, a C7-20 aralkyl group, a C6-20 aryl group, a heteroaryl group, a C6-20 alkylthio group, a C6-20 arylthio group and may form a ring through a joining group excluding an aromatic ring; M denotes two hydrogen atoms, a divalent metal atom, a divalent mono-substituted metal atom, a tetravalent di-substituted metal atom, or an oxy metal atom.]

[Chemical formula 2]

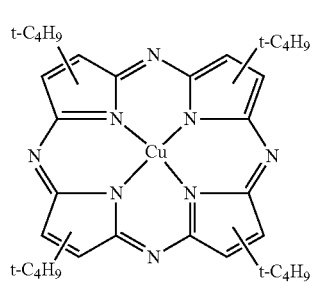

[In the formula (2), Cu denotes divalent copper; t-$C_4H_9$ denotes t-butyl; and substitution positions of these four substituent groups show positional isomers by positioning the substituent groups at each one position between A1 and A2, between A3 and A4, between A5 and A6, and between A7 and A8.]

The polymerization initiator to be used in the present invention is a peroxyester type peroxide or a peroxyketal type peroxide with a 10 hour-half life temperature of 90 to 110° C.

Practical examples of such a peroxyester type peroxide are t-hexyl peroxybenzoate, t-butyl peroxybenzoate, t-hexyl peroxyisopropyl monocarbonate, and t-butyl peroxyacetate. Also, a peroxyketal type peroxide may be 1,1-di(t-butylperoxy)cyclohexane.

Even a lens made of an allyl diglycol carbonate resin containing tetraazaporphyrin compound as a coloring agent can be a lens made of a resin provided with sufficiently exhibited properties of the tetraazaporphyrin compound as an organic coloring agent and a sufficient absorbance (same as transmittance) of the main absorption peak of visible light spectral transmittance in a wavelength range of 565 nm to 605 nm.

Herein, the sufficient absorbance (same as transmittance) of the main absorption peak may be adjusted in accordance with the expected capability of the spectacle lens; however, it is preferable that the main absorption peak of the visible light spectroscopic transmittance is a main absorption peak with 10% or less transmittance. In the case of such a main absorption peak, it can be said that the effect of the coloring agent on good antiglare and visibility properties can be sufficiently caused.

Further, besides the above-mentioned tetraazaporphyrin compound, based on the necessity, an ultraviolet absorbing coloring agent, or an infrared ray absorbing coloring agent, or both coloring agents may be added in combination as the organic coloring agent to be used in the invention.

Examples of the ultraviolet absorbing coloring agent may be as follows.
(1) 2-hydroxy-4-n-octoxybenzophenone
(2) 4-dodecyloxy-2-hydroxybenzophenone
(3) 2-2'-hydroxy-4-methoxybenzophenone In the case of using these ultraviolet absorbing coloring agents, it is preferable to absorb all of ultraviolet rays, that is, UV-A with longer wavelength (315 to 400 nm), UV-B with shorter wavelength (280-315 nm), and further shorter UV-C (100 to 280 nm).

To extinguish blue color flames of welding arc, it is required to absorb light with wavelength of 380 to 450 nm and in the case a polarizing film and an infrared ray absorbent are used, absorption is performed without adding a dye; however in the case no polarizing film is used, a yellow dye, an orange dye, a red dye, or their mixture, each absorbing blue color into the resin is used.

In addition, to making the lens for eyeglasses be colored with the brown type color tone, the yellow dye, the orange dye, the red dye, or their mixture is used.

It is also possible for dyeing a lens after lens molding without coloring the lens.

Infrared ray absorbents which can absorb infrared rays in a wavelength range of 780 to 2500 nm may be selected as the infrared ray absorbent and conventionally known infrared ray absorbing coloring agents may be employed and those exemplified below are preferable to be used.
(1) Infrared absorbents containing N,N,N',N'-tetrakis(p-substituted phenyl)-p-phenylenediamines, benzidines and their aluminum salts, and diimonium salts.
(2) N,N,N',N'-tetraarylquinone diimonium salts.
(3) bis(p-dialkylaminophenyl)[N,N-bis(p-dialkylaminophenyl)$_p$-aminophenyl] aminium salts.

In the case the eyeglass lens made of an allyl diglycol carbonate resin is a polarized lens having a polarizing film layer, the polarizing film can be obtained by a conventionally known formation method. For example, a film made of polyvinyl alcohol which is impregnated with iodine, or an iodine compound, or a dye by impregnation or the like and uniaxially stretched is preferably employed.

The lens for polarized eyeglasses can be made to be a commercialized product by filling voids having contact with a polarizing film arranged at intervals, for example, of 1 to 2 mm in both sides of the polarizing film with a lens material containing diethylene glycol bisallyl carbonate by insert molding of the lens material involving polymerization reaction of the diethylene glycol bisallyl carbonate; thereby uniting the polarizing film with a lens substrate for eyeglasses to obtain a lens material and then subjecting the lens material to grinding and polishing in accordance with the necessity of the degree of the lens. Additionally, of course, the lens for polarized eyeglasses can be produced by properly employing conventionally known means for laminating a polarizing film between two previously molded lens substrates.

EXAMPLES

Examples 1 to 5, Comparative Examples 1 to 5

Chemical names and structural formulas of organic peroxides, which is polymerization initiators, used in Examples 1 to 5 and Comparative Examples 1 to 5 are collectively shown in Tables below.

Each lens material composition was prepared by mixing 0.03 parts by weight of tetraazaporphyrin compound defined by the formula 2 as an organic coloring agent (PD-311S produced by Mitsui Chemicals Inc.), 0.4 parts by weight of an ultraviolet absorbent (SEESORB 100, CAS No. 131-56-6, produced by Shipro Kasei Kaisha, Ltd.), and a compound shown in Table 1 as the polymerization initiator with 100 parts by weight of CR-39 (diethylene glycol bisallyl carbonate), a liquid monomer of an ADC resin, and further adding 1.0 part by weight of acetone (solvent) and mixing and stirring the obtained mixture.

Further, separately, each polarizing film was produced as follows. After a polyvinyl alcohol film (commonly known as Vinylon film) with a thickness of 75 μm was uniaxially stretched 4 times as large, the film was immersed in an aqueous solution (dyeing solution) containing 0.1 wt. % of iodine, thereafter immersed in an aqueous solution containing 3 wt. % of boric acid, dried and successively subjected to heat treatment at 70° C. for 5 minutes to produce a plurality of polarizing film sheets (thickness 30 μm).

Each of the obtained polarizing film was formed to be spherical by putting the film on a spherical glass article and both faces of the film were coated with a urethane type adhesive (Polyonate 1000, produced by TOYOPOLYMER Co., Ltd.) and dried.

The resulting polarizing film was set in the center of the gasket and glass molds were arranged in both sides and the mixed and stirred lens material composition was injected between the polarizing film and glass molds and the temperature was gradually increased from normal temperature and kept at 100° C. as a curing temperature and then lowered gradually. A polarized lens for eyeglasses was obtained by releasing from the molds after taking 48 hours for increasing and decreasing the temperature over the all steps.

Figure 2:
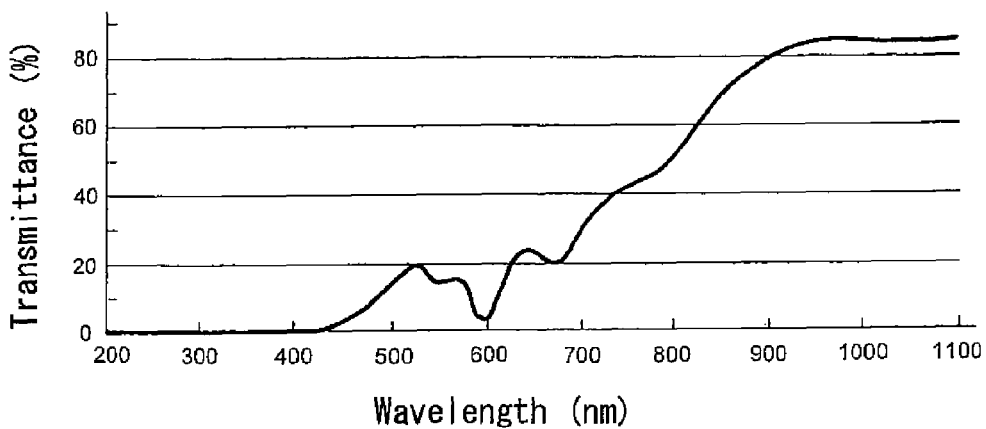
FIG. 2: A graphic chart showing spectroscopic spectrum of Example 2 and showing the relation of wavelength and transmittance.
Figure 3:
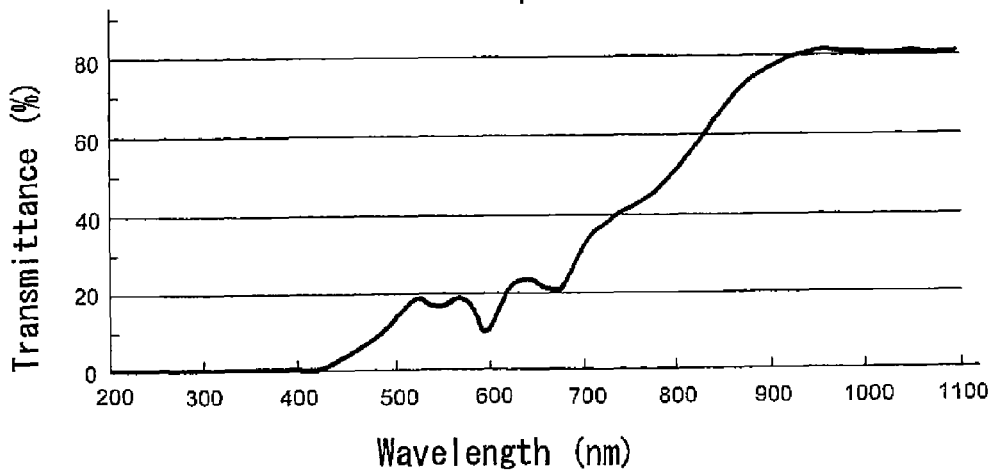
FIG. 3: A graphic chart showing spectroscopic spectrum of Example 3 and showing the relation of wavelength and transmittance.
Figure 4:
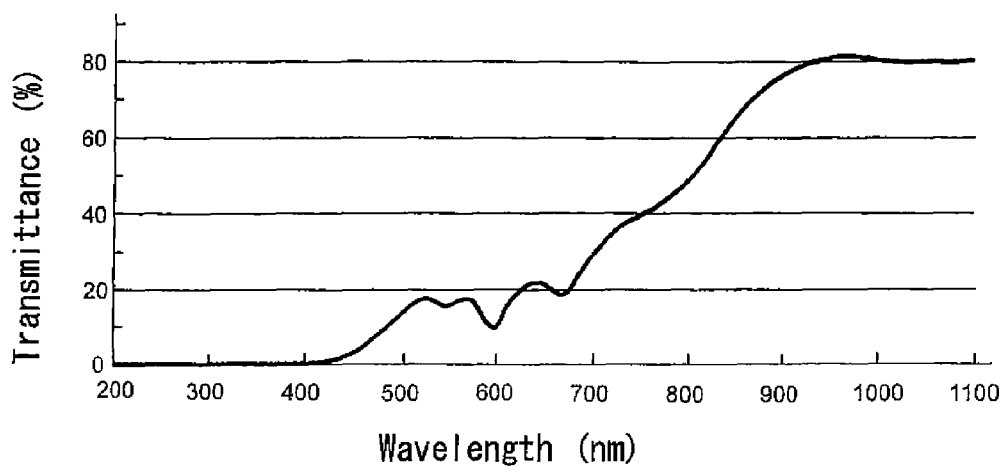
FIG. 4: A graphic chart showing spectroscopic spectrum of Example 4 and showing the relation of wavelength and transmittance.
Figure 5:
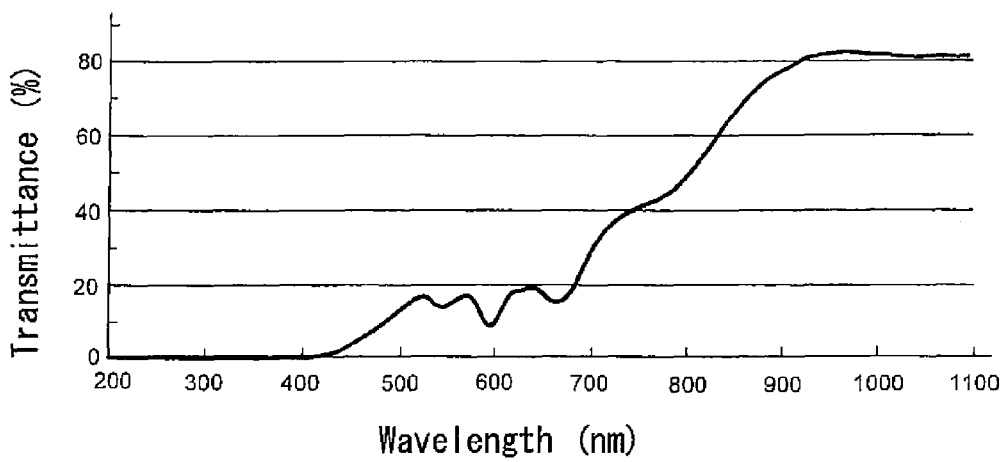
FIG. 5: A graphic chart showing spectroscopic spectrum of Example 5 and showing the relation of wavelength and transmittance.
Figure 6:
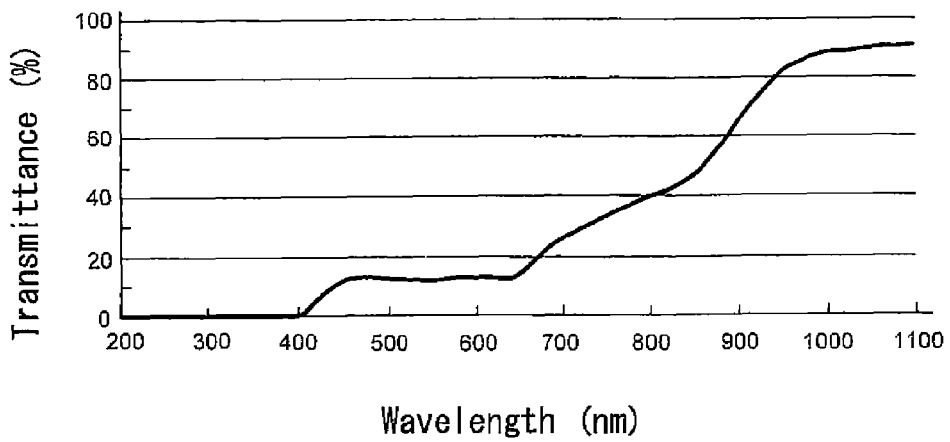
FIG. 6: A graphic chart showing spectroscopic spectrum of Comparative Example 1 and showing the relation of wavelength and transmittance.
Figure 7:
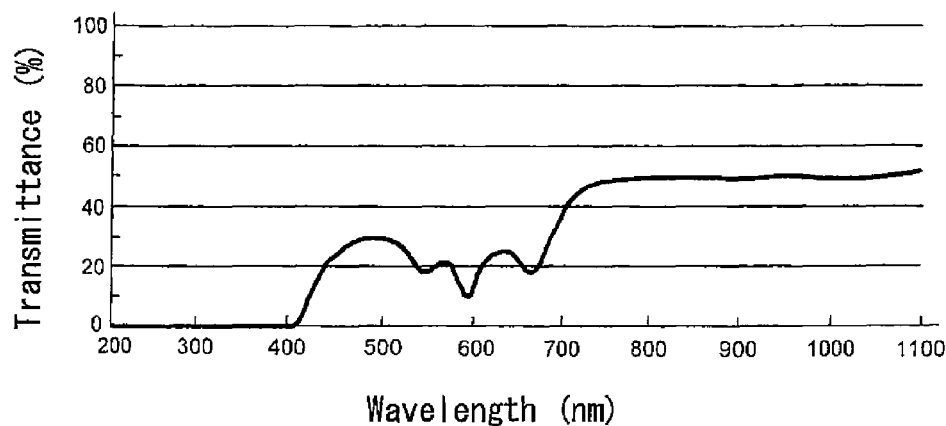
FIG. 7: A graphic chart showing spectroscopic spectrum of Comparative Example 2 and showing the relation of wavelength and transmittance.
Figure 8:
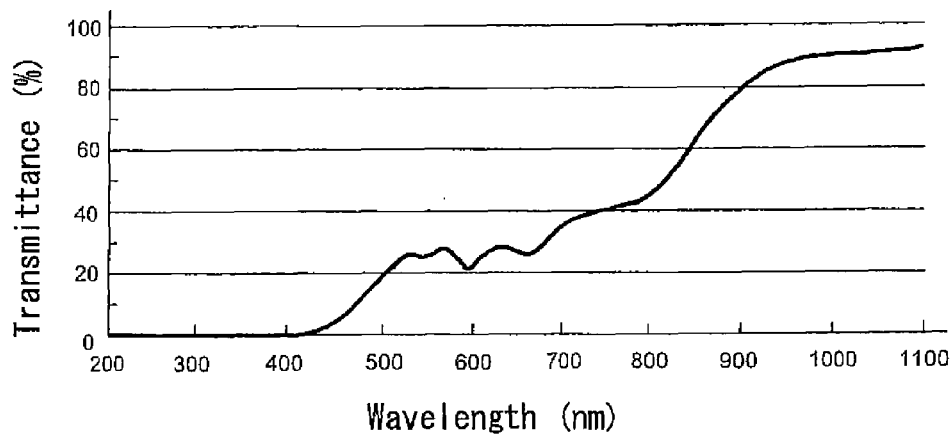
FIG. 8: A graphic chart showing spectroscopic spectrum of Comparative Example 3 and showing the relation of wavelength and transmittance.
Figure 9:
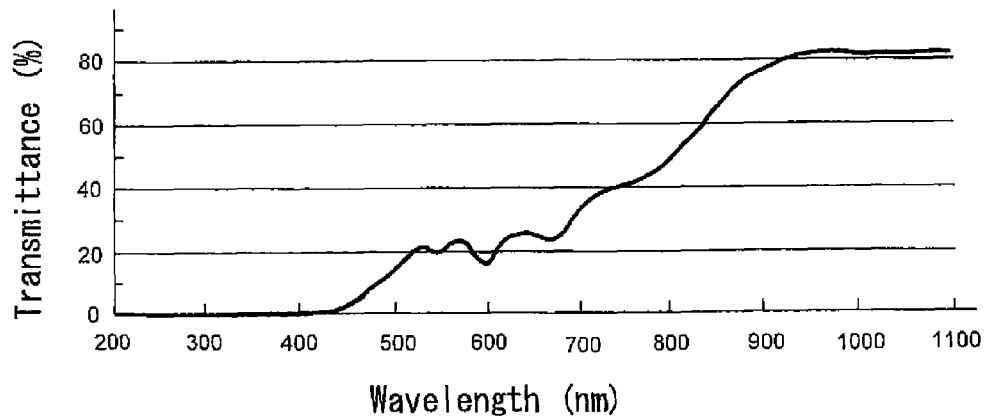
FIG. 9: A graphic chart showing spectroscopic spectrum of Comparative Example 4 and showing the relation of wavelength and transmittance.

Each of obtained polarized lens for eyeglasses was subjected to spectroscopic transmittance measurement by U-2000 Spectrophotometer produced by Hitachi Ltd. and the relation of wavelength and transmittance are shown in FIGS. 1 to 11. Further, the transmittance (%) of the main absorption peak of the spectroscopic transmittance around 580 to 585 nm wavelength was shown in Table 1.

From the results shown in Table 1 and FIGS. 1 to 11, with respect to Comparative Examples 1 to 4 in which polymerization initiators with 10 hour half-life temperature lower than 90° C. were used, Comparative Example 1 was found having no main peak of the spectroscopic transmittance around 580 to 585 nm wavelength and was thus confirmed to scarcely have absorbing capability.

Comparative Example 2 was insufficient in the hardness as a lens, found having a plurality of absorption peaks, considerably discolored, and thus inferior in the suitability as a spectacle lens. Comparative Example 3 had transmittance as high as 20.61% of the main absorption peak in the spectroscopic spectrum in a prescribed wavelength range and was not expected to give sufficient visibility. Comparative Example 4 also had transmittance as high as 15.1% of the main absorption peak in the spectroscopic spectrum in a prescribed wavelength range and was not expected to give sufficient visibility, too.

Comparative Example 5 was found slightly foaming and became opaque because of the foams in the molded body and thus could not sufficiently defoamed as a lens.

On the other hand, Examples 1 to 5 which satisfied the prescribed conditions were found giving plastic lenses each of which had a main absorption peak of 10% or less transmittance in a range of 565 nm to 605 nm and was durable for eyeglasses and polarized eyeglasses because of good antiglare and visibility properties owing to the coloring agents containing azaporphyrin compounds.

TABLE 1

| | | Polymerization initiator | Chemical structural formula | 10 Hour half-life temperature (° C.) | Trade name produced by Nippon Oil & Fats Co., Ltd. (addition amount; parts by weight) | Main peak transmittance (%) |
|---|---|---|---|---|---|---|
| Example | 1 | t-Hexyl peroxybenzoate | H₃C—CH₂—CH₂—C(CH₃)(CH₃)—O—O—C(=O)—C₆H₅ | 99.4 | Perhexyl Z (3.65) | 4.36 |
| | 2 | t-Butyl peroxybenzoate | CH₃—C(CH₃)(CH₃)—O—O—C(=O)—C₆H₅ | 104.3 | Perbutyl Z (3.0) | 3.3 |
| | 3 | t-Hexyl peroxyisopropyl monocarbonate | H₃C—CH₂—CH₂—C(CH₃)(CH₃)—O—O—C(=O)—O—CH(CH₃)(CH₃) | 95.0 | Perhexyl I (3.5) | 9.51 |

TABLE 1-continued

| | | Polymerization initiator | Chemical structural formula | 10 Hour half-life temperature (° C.) | Trade name produced by Nippon Oil & Fats Co., Ltd. (addition amount; parts by weight) | Main peak transmittance (%) |
|---|---|---|---|---|---|---|
| | 4 | t-Butyl peroxyacetate | 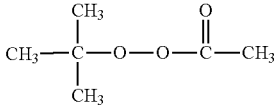 | 102.0 | Perbutyl A (4.36) | 8.97 |
| | 5 | 1,1-Di(t-butylperoxy) cyclohexane | 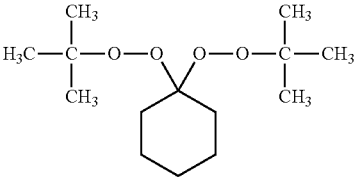 [SMILES: CC(C)(C)OOC1(OOC(C)(C)C)CCCCC1] | 90.7 | Perhexa C (S) (4.29) | 8.42 |
| Comparative Example | 1 | Diisopropyl peroxydicarbonate | 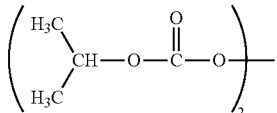 | 40.5 | Peroyl IPP (3.00) | No peak |
| | 2 | t-Butyl peroxy-2-ethylhexanoate | 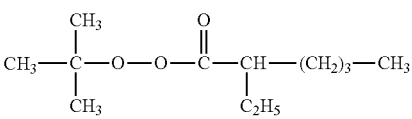 | 72.1 | Perbutyl O (3.34) | 10.9 |
| | 3 | Di(2-ethylhexyl) peroxydicarbonate | 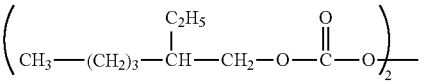 | 40.5 | Peroyl OPP (5.70) | 20.61 |
| | 4 | 1,1-Di(t-hexylperoxy) cyclohexane | 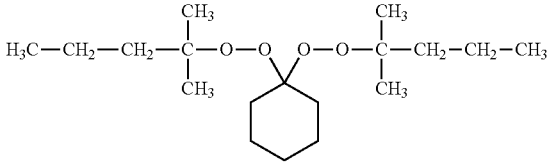 [SMILES: CCCC(C)(C)OOC1(OOC(C)(C)CCC)CCCCC1] | 87.1 | Perhexa HC (5.22) | 15.1 |
| | 5 | n-Butyl 4,4,-di-(t-butylperoxy) valerate | 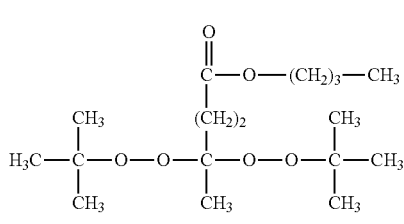 | 104.5 | Perhexa V (5.50) | 13.73 |

Example 6

After a polyvinyl alcohol film (commonly known as Vinylon film) with a thickness of 75 μm was uniaxially stretched 4 times as large, the film was immersed in an aqueous solution (dyeing solution) containing 0.1 wt. % of iodine, 0.04 wt. % of Direct Fast Orange, a direct dye, 0.02 wt. % of Serious Scarlet B, 0.01 wt. % of Mikaron Yellow RS and 0.012 wt. % of Diamira Red, reactive dyes, thereafter immersed in an aqueous solution containing 3 wt. % of boric acid, dried and successively subjected to heat treatment at 70° C. for 5 minutes to produce a plurality of polarizing film sheets (thickness 30 μm).

The color coordinate values L, a, b in the UCS color space of each obtained polarizing film (one sheet) were measured by an apparatus comprising E90 Color Measuring System in combination with Z-II Optical Sensor produced by Nippon Denshoku Industries Co., Ltd. and also the spectroscopic transmittance in a wavelength range covering 410 to 750 nm was measured by U-2000 Spectrophotometer produced by Hitachi Ltd. and further, the spectroscopic transmittance was measured in the case two sheets of the polarizing film were overlapped while the polarization axes being set at right angles.

The results were as follows: L=54.71, a=+2.20, b=+14.42 of the polarizing film (one sheet) and the average value of the variation of the transmittance (T %) in the wavelength range was 30% and the transmittance in the wavelength range of 410 to 750 nm was 0.0 to 0.8% (lower than 2%) in the case two sheets of the polarizing film were overlapped while the polarization axes being set at right angles and thus the polarizing film was found usable for brown color polarized eyeglasses.

The obtained polarizing film was formed to be spherical by putting the film on a spherical glass article and both faces of the film were coated with a urethane type adhesive (Polyonate 1000, produced by TOYOPOLYMER Co., Ltd.) and dried.

The resulting polarizing film was set in the center of the gasket and glass molds were arranged in both sides and a composition obtained by mixing and stirring a liquid monomer of ADC resin (diethylene glycol bisallyl carbonate), its catalyst, 3 wt. % of t-butyl peroxybenzoate (Perbutyl Z, produced by Nippon Oil & Fats Co., Ltd.), and 0.03 wt. % of tetraazaporphyrin compound (PD-311S, produced by Mitsui Chemicals Inc.) was injected between the polarizing film and glass molds and the temperature was increased at a constant heating speed from 20° C. to 100° C. in 12 hours to produce a polarized lens for eyeglasses.

One sheet of the obtained polarized lens was subjected to measurement of coordinate values L, a, b of the color and spectroscopic transmittance measurement in a wavelength range covering 410 to 750 nm and also spectroscopic transmittance was measured in the case two sheets of the polarized lens were overlapped while the polarizing axes being set at right angles.

As a result, the one sheet of the polarized lens was found having L=32.5, a=+0.87, b=−1.76 and a main peak with 10% or less visible light spectroscopic transmittance in the wavelength range of 580 to 600 nm and in the case two polarizing film sheets were overlapped while being set at right angles, the transmittance in the wavelength range of 410 to 750 nm was 0.0 to 0.2% (lower than 2%) and a red color object could be seen clearly. That is, good antiglare and visibility properties were reliably obtained owing to the tetraazaporphyrin compound to protect human being from feeling glare with the naked eyes and in addition, the polarized lens could not only make light rays to be merely neutralized color but also could limit light transmittance quantity in a specified wavelength range rays and make it possible to reliably distinguish the colors as those observed with the necked eyes without erroneously recognizing colors and was thus found having excellent capabilities as polarized eyeglasses.

The invention claimed is:

1. An eyeglass lens, comprising a polymerized product comprising diethylene glycol bisallyl carbonate as a lens material, an organic coloring agent containing a tetraazaporphyrin compound, and a peroxyester type peroxide or a peroxyketal type peroxide with a 10 hour-half life temperature of 90 to 110° C., and having a main absorption peak of the visible light spectroscopic transmittance in a wavelength of 565 nm to 605 nm.

2. The eyeglass lens according to claim 1, wherein the organic coloring agent is an organic coloring agent containing an ultraviolet-absorbing coloring agent, an infrared ray-absorbing coloring agent, or both of these coloring agents.

3. The eyeglass lens according to claim 1, wherein the main absorption peak of the visible light spectroscopic transmittance is a main peak of 10% or less transmittance.

4. The eyeglass lens according to claim 1, wherein the peroxyester type peroxide is t-hexyl peroxybenzoate, t-butyl peroxybenzoate, t-hexyl peroxyisopropyl monocarbonate, or t-butyl peroxyacetate.

5. The eyeglass lens according to claim 1, wherein the peroxyketal type peroxide is 1,1-di(t-butylperoxy)cyclohexane.

6. The eyeglass lens according to claim 1 being a polarized lens having a polarizing film layer.

7. The eyeglass lens according to claim 6, wherein the polarizing film is made of polyvinyl alcohol and a polarizing agent is an iodine type polarizing agent.

8. A method for producing an eyeglass lens made of an allyl diglycol carbonate resin comprising mixing a peroxyester type peroxide or a peroxyketal type peroxide with a 10 hour-half life temperature of 90 to 110° C. as a polymerization initiator and an organic coloring agent containing a tetraazaporphyrin compound with a diethylene glycol bisallyl carbonate as a lens material to obtain a mixture, mixing and stirring the mixture to obtain a composition, injecting the composition in a mold for molding an eyeglass lens, and thereafter heating and curing the composition.

9. The eyeglass lens according to claim 2, wherein the main absorption peak of the visible light spectroscopic transmittance is a main peak of 10% or less transmittance.

10. The eyeglass lens according to claim 2, wherein the peroxyester type peroxide is t-hexyl peroxybenzoate, t-butyl peroxybenzoate, t-hexyl peroxyisopropyl monocarbonate, or t-butyl peroxyacetate.

11. The eyeglass lens according to claim 3, wherein the peroxyester type peroxide is t-hexyl peroxybenzoate, t-butyl peroxybenzoate, t-hexyl peroxyisopropyl monocarbonate, or t-butyl peroxyacetate.

12. The eyeglass lens according to claim 2, wherein the peroxyketal type peroxide is 1,1-di(t-butylperoxy)cyclohexane.

13. The eyeglass lens according to claim 3, wherein the peroxyketal type peroxide is 1,1-di(t-butylperoxy)cyclohexane.

14. The eyeglass lens according to claim 2 being a polarized lens having a polarizing film layer.

15. The eyeglass lens according to claim 3 being a polarized lens having a polarizing film layer.

16. The eyeglass lens according to claim 4 being a polarized lens having a polarizing film layer.

17. The eyeglass lens according to claim 5 being a polarized lens having a polarizing film layer.

* * * * *